United States Patent [19]

Esselborn et al.

[11] 4,040,859

[45] Aug. 9, 1977

[54] TIN-CONTAINING LUSTROUS PIGMENTS

[75] Inventors: Reiner Esselborn; Horst Bernhard, both of Darmstadt, Germany

[73] Assignee: Merck Patent Gesellschaft mit beschraenkter Haftung, Darmstadt, Germany

[21] Appl. No.: 687,458

[22] Filed: May 18, 1976

[30] Foreign Application Priority Data

May 22, 1975 Germany .............................. 2522573

[51] Int. Cl.$^2$ ............................................... C09C 1/00
[52] U.S. Cl. .............................. 106/291; 106/308 B; 427/215; 428/363
[58] Field of Search ........................... 106/291, 308 B; 427/215; 428/363

[56] References Cited

U.S. PATENT DOCUMENTS

| 3,087,828 | 4/1963 | Linton | 106/291 |
| 3,087,829 | 4/1963 | Linton | 106/291 |

FOREIGN PATENT DOCUMENTS

| 964,403 | 3/1975 | Canada | 106/291 |

*Primary Examiner*—Patrick P. Garvin
*Assistant Examiner*—J. V. Howard
*Attorney, Agent, or Firm*—Millen & White

[57] ABSTRACT

Lustrous pigments based on mica flakes coated with metal oxides have a very uniform coating layer of tin dioxide, which can contain aluminum oxide, or the hydrates thereof.

10 Claims, No Drawings

TIN-CONTAINING LUSTROUS PIGMENTS

BACKGROUND OF THE INVENTION

This invention relates to lustrous $SnO_2$-coated mica flakes.

Lustrous pigments based on mica flakes coated with metal oxides are known and described in German patent specifications Nos. 1,467,468; 1,959,998; 2,009,566 and in published specification No. 2,214,545. However, under many conditions of use, the light stability of these pigments is less than satisfactory.

The coating of mica with $SnO_2$ is disclosed in German patent specification No. 1,467,468, as a layer over a $TiO_2$ layer or in admixture with $TiO_2$ on mica. X-ray investigation of these pigment shows that the $TiO_2$, in spite of its tin content, is present in the anatase modification.

According to published German specification No. 2,214,545, pigments are preferred in which the metal oxide layer consists preponderantly of rutile $TiO_2$ plus a small amount of tin oxide, with the concentration of the tin oxide being greater in the regions closest to the mica. The $SnO_2$ content of the metal oxide layer is preferably 0.5 to 5 wt. % but in no case to more than 20 wt. %. However, it has been found that these pigments contain $TiO_2$ which is not completely and not reproducibly in the rutile form but instead is very frequently present at least partially in the anatase form, although it is stated in published German patent specification No. 2,214,545, that the $TiO_2$ was present "substantially in rutile form."

In German published specification No. 1,592,944, the addition of 1 to 50 wt. % of aluminum oxide during calcination of mica or of mica-containing pigments to bring about color stabilization of the mica, is described.

Bernhard et al., in U.S. Pat. No. 3,874,890, describe the precipitation of iron oxide on mica flakes coated with $TiO_2$ and/or $ZrO_2$ by precipitation of iron hydroxide from a ferrous salt solution and conversion to $Fe_2O_3$. The nacreous pigment product has a golden-yellow hue.

Bernhard et al., U.S. Pat. No. 3,926,659, obtain nacreous pigments of various hues by formation of one only of $\alpha$-, $\beta$-, or $\gamma$-FeOOH or magnetite in a continuous uniform layer on mica flakes by precipitation from an aqueous solution of an iron salt, in the presence of an oxidizing agent.

In U.S. Pat. No. 3,951,679, Bernhard et al. apply ferric hexacyanoferrate (II) (Berlin Blue) to mica flakes precoated with titanium dioxide or zirconium dioxide or hydrates thereof.

Esselborn and Bernhard, "Rutile-containing Lustrous Pigments," Ser. No. 616,843, filed Sept. 25, 1975, disclose the deposition of alternate layers, consisting at least of rutile $TiO_2$, $SnO_2$ and rutile, of metal oxides on mica flakes.

Lustrous pigments with a thin, uniform $SnO_2$ layer on mica flakes and processes for the production of such pigments were thus hitherto unknown.

It has been found, in accordance with this invention, that suprisingly light-stable mica flake pigments with lustrous gloss are obtained by deposition of tin dioxide hydrate in a very smooth layer on mica flakes.

SUMMARY OF THE INVENTION

In its composition aspect, this invention relates to a lustrous pigment of improved light fastness consisting essentially of translucent mica flakes coated with up to 90% of the weight of the pigment of a continuous uniform layer of a thickness up to 200 nm. of tin dioxide, or a hydrate thereof, produced by precipitation in the presence of an oxidizing agent from a tin (II) salt solution in which the mica flakes are suspended.

DETAILED DESCRIPTION

The subject of the invention is a lustrous pigment of mica flakes coated with a metal oxide layer consisting of a very uniform layer of tin dioxide, which can contain aluminum oxide. Each of the oxides can be in hydrated form.

The subject of the invention is also a process for the production of these pigments by precipitating metal oxide hydrates from salt solutions on to the mica flakes and subsequently washing the products obtained, drying and possibly calcining wherein a solution of Sn(II) salt, preferably $SnCl_2$, is used to produce the metal oxide hydrate and the precipitation is done in the presence of an oxidizing agent, preferably also in the presence of a water-soluble aluminum salt.

Surprisingly, contrary to statements in the literature, coating of mica flakes to form lustrous pigments with good gloss, is unsuccessful with Sn(IV) solutions but works using Sn(II) solutions in the presence of an oxidizing agent. It therefore seems critical to the process of the invention to carry out the oxidation slowly and during the precipitation. Under these conditions, surprisingly smooth tin dioxide hydrate layers are obtained on the mica, in uniformity not achieved hitherto. Thus, pigments described in the literature as produced using $SnO_2$ have been unimportant because no useable lustrous pigments were formed by the known processes.

It has also been found that addition of a small amount of aluminum salts, from which $Al_2O_3$ is later formed, is advantageous for the formation of uniform layers. Although the effect of aluminum ions and/or of aluminum oxide or of its hydrates is not completely understood, three phenomena seem to be especially important. Co-precipitation of aluminum hydroxide hydrates prevents the formation of cracks which otherwise occur upon calcination of tin dioxide hydrate layers of high water content. Addition of aluminum salts also appears to promote formation of smooth tin dioxide layers and quantitative deposition of the precipitate on the mica flakes.

Coating of the mica flakes is done in a known manner, wherein the mica being coated is normally slurried in desalinated water at temperatures of about 40° to 95° C. Desalinated water is the water normally used in chemical laboratories which is deionized by ion-exchange resins.

The suspension is adjusted to pH 0.5 to 3.0, preferably about 1.0 to 2.5, by addition of an acid, e.g., hydrochloric acid. The salt solution is added so that the precipitate which forms is deposited immediately and quantitatively. That is, the salt solutions should be metered to the reaction only at the rate at which the surface being coated can take up per unit time. To the warmed suspension is then slowly added an aqueous solution of tin salts. The aqueous solution of the tin salts is adjusted to an acid molarity between about 0.1 and 5, e.g., by hydrochloric acid. The upper value is not critical.

Tin(II) chloride and tin(II) sulfate are preferred tin salts, but the anion is not critical. Concentrations of tin(II) salt solutions can be varied over wide ranges but, preferably are 0.1 and 3 molar.

The salt solution can contain water-soluble aluminum salts, for example, aluminum chloride, acetate, nitrate and sulfate. About 0.01 to 2 mole AL per mole $Sn^{2+}$, preferably about 0.1 to 1 mole, are added. It is more convenient to use a salt solution which contains tin and aluminum salts. In principle, however, separate salt solutions can be added.

During the precipitation, both metal ions are preferably present in the solution. Astoundingly, the desired effects are achieved in the presence of only traces of Al ions. This is very unexpected only trace amounts of Al ions present during precipitation or formation of hydrolysis products are incorporated into the pigment. Whereas tin ions are quantitatively precipitated on the mica flakes, a considerable part of the Al ions remains behind in mother liquors from the precipitation. In some cases, up to 96% of Al salt charged is found in the solution by back titration.

The precipitation is carried out in the presence of an oxidizing agent, which can be present in the salt solution or supplied separately. Oxidizing agents, in principle, include any compound which can oxidize Sn(II) to Sn(IV) ions, e.g., air, oxygen, $H_2O_2$ and hypochlorite. Hydrogen peroxide, and chlorates, especially potassium chlorate, are preferred. The oxidizing agent is preferably added in an amount about equivalent to the tin salt solution used. However, concentrations are not critical because atmospheric oxygen for the oxidation can be added by stirring. Therefore, the oxidizing agent can be added in a deficient amount or in an excess. Optimum conditions can easily be ascertained by routine experiments.

Expediently, the aqueous solution of oxidizing agent is added separately from the metal salt solution but simultaneously. It can also be present in the mica suspension initially. Normally, it is preferable to avoid introducing other foreign ions, which may affect the properties of the coating adversely, with the oxidizing agent.

It is also expedient to keep pH as constant as possible during the precipitation. Aqueous alkali metal or ammonium hydroxide solution, preferably dilute aqueous sodium hydroxide solution, or gaseous ammonia, can be added slowly, as required.

As layer thickness increases during the coating, the pigment particles pass through the color scale known for the lustrous pigments. Coatng can be stopped at any desired color shade. The coated mica flakes are usually separated from the reaction mixture, washed thoroughly with water and dried. Normally, the dried pigment is calcined for about 10 minutes to about 4 hours, at temperatures of up to about 1100°, preferably between about 600° and 1000° C. For some purposes, non-calcined pigment, dried between 50° and 150° C. for several hours, e.g., 2 to 24 hours, is preferred.

The pigments of this invention can be produced from the mica flakes customary for this purpose. Muscovite is the most frequently used mica pigment. The mica flakes are about 5 to 200 microns in diameter and about 0.1 to 5 microns in thickness, preferably about 0.5 micron.

The new pigments have, depending on the color shade desired, a metal oxide layer on the mica flakes about 20 to about 200 nm in thickness, corresponding to a metal oxide content of about 10 to 90% by weight. As a rule, pigments with a substantially lower metal oxide content (below 5%) do not have the desired luster. Determination of aluminum oxide content in the metal oxide layer, practically speaking, is impossible since aluminum is a constituent of mica. The $Al_2O_3$ content of the metal oxide layer is not critical, but the presence of Al ions during precipitation of hydrolysis products formed from tin salts is preferred. However, from back titration of the precipitating solutions, it appears that the proportion of $Al_2O_3$ in metal oxide layer of the final pigment varies between traces, e.g., 0.001% by weight, and 10%, usually not above 7%.

Pigments of this invention can be employed in conventional uses of pigments. They are especially suitable for applications in which light stability is important, e.g., automobile lacquers, or in cosmetics, where definite and differentiated color nuances are desired. Concentrations in ultimate formulations can vary, depending on the field of use, between 0.1 and 80% by weight.

With our further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

60 g. of muscovite (diameter 20 – 40 $\mu$) are suspended in 1.2 liter of fully desalinated water. The suspension is adjusted with dilute hydrochloric acid to pH 1.75 and heated to 75° C. To apply the coating, solutions of 180 g. of $SnCl_2 \cdot 2H_2O$ and 9 g. of $AlCl_3 \cdot 6H_2O$ in 1000 ml. of 5% hydrochloric acid and of 41 g. of $KClO_3$ in 1000 ml. of water are metered in simultaneously. The pH of the suspension is kept at pH 1.75 by addition of 15% aqueous sodium hydroxide solution.

As the coating progresses, the pigment exhibits, after a silvery shade, a series of interference colors, i.e., yellow - red - blue - green. The coating is stopped at the green interference color, after 1250 ml. of tin (II) salt solution has been added. The preparation is filtered off, washed with completely desalinated water, dried at 120° C. and calcined for half an hour at 950° C. The preparation is a pale yellowish powder, with a green interference color observed in the case of parallel orientation of the pigment flakes. The metal oxide layer is about 180 nm. thick and contains $SnO_2$, 72 wt. %; mica, 28 wt. %; $Al_2O_3$, 0.3 wt. %, determined by back titration.

EXAMPLE 2 b 5.0 kg. of muscovite (diameter about 20 – 40 82 ) are suspended in 100 l. of completely desalinated water and heated to 70° C. After the pH has been adjusted to 2.2 with hydrochloric acid, solutions of 4.5 kg. of $SnCl_2 \cdot 2H_2O$, 0.45 kg. of $AlCl_3 \cdot 6H_2O$ and 2.84 l. of concentrated hydrochloric acid in 21 l. of water and 1.0 kg. of $KClO_3$ in 25 l. of water are added simultaneously. The suspension is kept at pH 2.2 by addition of 30% aqueous sodium hydroxide solution.

As the coating progresses, the pigment exhibits a silvery shade and then a series of interference colors. The coating is discontinued at a blue-green interference color upon utilization of about 90 l. of tin salt solution. The pigment is worked up analogously to Example 1. The layer thickness of the metal oxides is about 160 nm. and the pigment contains 32 wt. % of mica, 67 wt. % of $SnO_2$, and 1 wt. % of $Al_2O_3$.

EXAMPLE 3

60 g. of muscovite (diameter 20 - 40 μ) are suspended in 1.2 l. of completely desalinated water and the suspension heated to 70° C. pH is adjusted to 2.1 with dilute hydrochloric acid. For the coating, a solution of 36 g. of $SnCl_2 \cdot 2H_2O$, 4.0 g. of $AlCl_3 \cdot 6H_2O$ and 60 ml. of concentrated hydrochloric acid is allowed to run in slowly, together with a solution of 7.2 g. of $KClO_3$ in 200 ml. of water. pH is kept at 2.1 by simultaneous addition of 3% aqueous sodium hydroxide solution. After addition of about 350 ml. of tin salt solution, the pigment has a silvery gloss; after addition of about 650 ml., a gold shade. The pigment is filtered off and worked up as usual. It is a yellowish colored powder with a clear gold gloss. the layer thickness is about 80 nm. Analysis: mica 45 wt. %; $SnO_2$, 53 wt. %; $Al_2O_3$, 2 wt. %.

EXAMPLE 4

60 g. of muscovite with a flake diameter of 10 - 50 μ and a specific surface area of about 3 m²/g. are suspended in 2 l. of completely desalinated water. The suspension is adjusted to pH 1.75 by addition of hydrochloric acid and heated to 75° C. The following solutions are added simultaneously at the same rate:
 a. a solution of 150 g. of $SnCl_2 \cdot 2H_2O$ and 10 g. of $AlCl_3 \cdot 6H_2O$ in 1000 ml. of 10% hydrochloric acid, and
 b. A 5% $H_2O_2$ solution.

15% aqueous sodium hydroxide solution is added to maintain pH at 1.75. The tin (IV) hydroxide being precipitated is deposited quantitatively on the mica flakes and forms a smooth coating. As layer thickness of tin hydroxide on the mica flakes increases, the pigment exhibits the known series of interference colors. At the green color, coating is discontinued. The product is filtered off, washed with completely desalinated water, dried at 100° C. for 24 hours and finally calcined at 950° C. for 30 minutes. The pigment has a strong luster with a green interference color. Metal oxide layer thickness: about 160 nm. Analysis: mica, 29 wt. %; $SnO_2$, 69 wt. %; $Al_2O_3$, 2 wt. %.

EXAMPLE 5

60 g. of muscovite with a flake diameter of 10 - 50 μ and a specific surface area of about 2 m.²/g. are suspended in 2 l. of completely desalinated water. The suspension is adjusted to pH 1.5 with hydrochloric acid and heated to 70° C. The following solutions are added simultaneously and at the same rate:
 a. a solution of 150 g. of $SnCl_2 \cdot 2H_2O$ and 35 g. $KAl(SO_4)_2 \cdot 12H_2O$ in 1000 ml. of 10% hydrochloric acid, and
 b. a 3% $KClO_3$ solution.

By simultaneous addition of 15% aqueous sodium hydroxide solution, pH value is kept at 1.5. The tin hydroxide precipitate deposits on the mica flakes in a uniform and smooth layer and gives a product with good luster and, depending on the thickness of tin hydroxide layer, various interference colors. The coating is discontinued at the blue interference color. The product is filtered off, washed, dried and calcined at about 900° C. for 20 minutes. The pigment has a blue interference color and a lively luster. Metal oxide layer thickness: about 140 nm. Analysis: mica, 33 wt. %; $SnO_2$, 65 wt. %; $Al_2O_3$, 2 wt. %.

EXAMPLE 6

The coating is done in accordance with Example 5 using 30 g. of $Al(NO_3)_3 \cdot 9H_2O$ instead of 35 g. of $KAl(SO_4)_2 \cdot 12H_2O$. The reaction is done at pH 1.25. A blue lustrous pigment with a metal oxide layer thickness of about 140 nm. is obtained. Analysis: mica, 34 wt. %; $SnO_2$, 65 wt. %; $Al_2O_3$, 1 wt. %.

EXAMPLE 7

60 g. of muscovite are coated, by the procedure of Example 5 with hydrated tin dioxide, but the pigment is not calcined. After drying for about 20 hours at 100° C., white lustrous powder with a blue interference color is obtained. It contains 30% mica, 60% $SnO_2$, about 1% $Al_2O_3$ and 9% water.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A lustrous, light-stable mica flake pigment consisting essentially of mica flakes coated by precipitation with up to 90% by weight of the pigment of a continuous, smooth, uniform layer consisting essentially of tin dioxide or a hydrate thereof and up to 10% by weight of coprecipitated aluminum oxide or a hydrate thereof.

2. A pigment according to claim 1, wherein the tin dioxide layer is 20 to 200 nm. in thickness.

3. A pigment according to claim 1, wherein the tin dioxide layer contains 0.001 to 7% by weight of coprecipitated aluminum oxide or a hydrate thereof.

4. A process for the production of mica flake pigments according to claim 1, which comprises hydrolyzing a Sn (II) salt solution in which mica flakes are suspended in the presence of an Sn (II) → Sn (IV) oxidizing agent to form said coated mica flakes.

5. A process according to claim 4, wherein the reaction is effected in the presence of a water-soluble aluminum salt.

6. A process according to claim 5, wherein said solution contains about 0.01 to 2 moles of water-soluble aluminum salt per mole of Sn (II) salt.

7. A process according to claim 4, wherein the Sn (II) salt is $SnClO_2$.

8. A process according to claim 4, wherein the oxidizing agent is $KClO_3$ or $H_2O_2$.

9. A process according to claim 4, wherein the precipitation is effected at a constant pH of 0.5–3.0.

10. A process according to claim 9, wherein the tin dioxide precipitate which forms is deposited immediately and quantitatively onto said mica flakes.

* * * * *